US011067305B2

(12) United States Patent
Brahme et al.

(10) Patent No.: US 11,067,305 B2
(45) Date of Patent: Jul. 20, 2021

(54) METHOD AND SYSTEM FOR HEATING AUTO-SETBACK

(71) Applicant: Lennox Industries Inc., Richardson, TX (US)

(72) Inventors: Rohini Brahme, Carrollton, TX (US); Mark Olsen, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 55 days.

(21) Appl. No.: 16/019,784

(22) Filed: Jun. 27, 2018

(65) Prior Publication Data

US 2020/0003441 A1    Jan. 2, 2020

(51) Int. Cl.
*F24F 11/46* (2018.01)
*F24F 11/64* (2018.01)
(Continued)

(52) U.S. Cl.
CPC ............. *F24F 11/46* (2018.01); *F24F 11/56* (2018.01); *F24F 11/61* (2018.01); *F24F 11/64* (2018.01);
(Continued)

(58) Field of Classification Search
CPC .. F24F 11/46; F24F 11/64; F24F 11/65; F24F 11/61; F24F 11/56; F24F 11/86;
(Continued)

(56) References Cited

U.S. PATENT DOCUMENTS 5,454,511 A * 10/1995 Van Ostrand ............ F24F 11/00
236/46 R
5,822,997 A * 10/1998 Atterbury ............... F25B 13/00
62/180
(Continued)

FOREIGN PATENT DOCUMENTS

EP         2908206 A1     8/2015
WO    WO-2017056403 A1 *  4/2017  .............. F24F 11/89

OTHER PUBLICATIONS

U.S. Appl. No. 14/712,019, Golden et al.
(Continued)

*Primary Examiner* — Mohammad Ali
*Assistant Examiner* — Joshua T Sanders
(74) *Attorney, Agent, or Firm* — Shackelford, Bowen, McKinley & Norton, LLP

(57) ABSTRACT

A method of operating an HVAC system using a controller includes predicting a first predicted temperature of an enclosed space during an unoccupied time with the HVAC system off. The controller determines if the first predicted temperature is less than a set-point temperature. Responsive to a determination that the first predicted temperature is less than the set-point temperature, the controller predicts a second predicted temperature of the enclosed space if the HVAC system is operated for a first runtime. The controller determines if the second predicted temperature is less than the set-point temperature and, responsive to a determination that the second predicted temperature is not less than the
(Continued)

set-point temperature, the controller operates the HVAC system for the first runtime.

17 Claims, 6 Drawing Sheets

(51) Int. Cl.
| | | |
|---|---|---|
| F24F 11/86 | (2018.01) | |
| F24F 11/65 | (2018.01) | |
| F24F 11/56 | (2018.01) | |
| F24F 11/61 | (2018.01) | |
| G05B 19/042 | (2006.01) | |
| F24F 120/10 | (2018.01) | |
| F24F 140/60 | (2018.01) | |
| F24F 130/10 | (2018.01) | |

(52) U.S. Cl.
CPC .............. *F24F 11/65* (2018.01); *F24F 11/86* (2018.01); *G05B 19/042* (2013.01); *F24F 2120/10* (2018.01); *F24F 2130/10* (2018.01); *F24F 2140/60* (2018.01); *G05B 2219/2614* (2013.01)

(58) Field of Classification Search
CPC .............. F24F 2140/60; F24F 2130/10; F24F 2120/10; G05B 19/042; G05B 2219/2614
USPC ........................................................ 700/276
See application file for complete search history.

(56) References Cited

U.S. PATENT DOCUMENTS

| | | | |
|---|---|---|---|
| 6,385,510 B1 | 5/2002 | Hoog et al. | |
| D473,151 S | 4/2003 | Shaland et al. | |
| 6,764,019 B1 | 7/2004 | Kayahara et al. | |
| 7,088,255 B2 | 8/2006 | Ridolfo et al. | |
| D591,305 S | 4/2009 | Shimoda | |
| 7,571,014 B1 | 8/2009 | Lambourne et al. | |
| 8,195,313 B1 | 6/2012 | Fadell et al. | |
| 8,365,074 B1 | 1/2013 | Wagner et al. | |
| D676,060 S | 2/2013 | Frost et al. | |
| D676,457 S | 2/2013 | Frost et al. | |
| D682,850 S | 5/2013 | Del Pasqua | |
| D687,057 S | 7/2013 | Plitkins | |
| D687,845 S | 8/2013 | Lee | |
| D690,322 S | 9/2013 | Matas et al. | |
| 8,620,841 B1 | 12/2013 | Filson et al. | |
| D697,076 S | 1/2014 | Oda et al. | |
| D701,515 S | 3/2014 | Matas et al. | |
| D701,869 S | 4/2014 | Matas et al. | |
| D709,913 S | 7/2014 | Hurd | |
| D722,606 S | 2/2015 | Stroupe et al. | |
| D733,591 S | 7/2015 | Golden et al. | |
| D734,179 S | 7/2015 | Golden et al. | |
| D736,827 S | 8/2015 | Omiya | |
| 9,167,368 B2 | 10/2015 | De Jong et al. | |
| D742,898 S | 11/2015 | Matas et al. | |
| D748,126 S | 1/2016 | Sarukkai et al. | |
| D749,092 S | 2/2016 | Lee et al. | |
| D755,201 S | 5/2016 | Kim | |
| D758,422 S | 6/2016 | Zhao | |
| D759,077 S | 6/2016 | Bergmann et al. | |
| D759,079 S | 6/2016 | Carlton et al. | |
| D760,246 S | 6/2016 | Birks et al. | |
| D761,297 S | 7/2016 | Eder | |
| D763,868 S | 8/2016 | Lee et al. | |
| D767,586 S | 9/2016 | Kwon et al. | |
| D775,658 S | 1/2017 | Luo et al. | |
| D777,744 S | 1/2017 | Wang et al. | |
| D781,327 S | 3/2017 | Conze et al. | |
| D783,046 S | 4/2017 | Dzjind et al. | |
| D783,672 S | 4/2017 | Rajasankar et al. | |
| D785,017 S | 4/2017 | Wang et al. | |
| D786,269 S | 5/2017 | Lin et al. | |
| D786,278 S | 5/2017 | Motamedi | |
| D787,551 S | 5/2017 | Oh et al. | |
| 2003/0070437 A1 | 4/2003 | Hafner et al. | |
| 2003/0076745 A1 | 4/2003 | Chapman | |
| 2005/0234807 A1 | 10/2005 | Toffey | |
| 2007/0136679 A1 | 6/2007 | Yang | |
| 2007/0241203 A1 | 10/2007 | Wagner et al. | |
| 2009/0079765 A1 | 3/2009 | Hoover | |
| 2009/0171970 A1 | 7/2009 | Keefe | |
| 2010/0025483 A1 | 2/2010 | Hoeynck et al. | |
| 2010/0036560 A1 | 2/2010 | Wright et al. | |
| 2010/0070085 A1 | 3/2010 | Harrod et al. | |
| 2010/0070089 A1 | 3/2010 | Harrod et al. | |
| 2010/0149096 A1 | 6/2010 | Migos et al. | |
| 2010/0243231 A1* | 9/2010 | Rosen | G05D 23/1904 165/237 |
| 2011/0015802 A1 | 1/2011 | Imes | |
| 2011/0046792 A1 | 2/2011 | Imes et al. | |
| 2011/0131610 A1 | 6/2011 | Lee et al. | |
| 2011/0157046 A1 | 6/2011 | Lee et al. | |
| 2011/0202185 A1 | 8/2011 | Imes et al. | |
| 2012/0064923 A1 | 3/2012 | Imes et al. | |
| 2012/0085831 A1* | 4/2012 | Kopp | G05D 23/00 236/46 A |
| 2012/0124520 A1 | 5/2012 | Samp et al. | |
| 2012/0130547 A1 | 5/2012 | Fadell et al. | |
| 2012/0131504 A1 | 5/2012 | Fadell et al. | |
| 2012/0179300 A1 | 7/2012 | Warren et al. | |
| 2012/0203379 A1 | 8/2012 | Sloo et al. | |
| 2012/0239221 A1 | 9/2012 | Mighdoll et al. | |
| 2012/0259470 A1 | 10/2012 | Nijhawan et al. | |
| 2012/0274662 A1 | 11/2012 | Kim et al. | |
| 2013/0147723 A1 | 6/2013 | Bias et al. | |
| 2013/0151016 A1 | 6/2013 | Bias et al. | |
| 2013/0159849 A1 | 6/2013 | Lee et al. | |
| 2013/0173064 A1* | 7/2013 | Fadell | G05D 23/1902 700/276 |
| 2013/0245837 A1 | 9/2013 | Grohman | |
| 2014/0126425 A1 | 5/2014 | Burd et al. | |
| 2014/0211985 A1 | 7/2014 | Polese et al. | |
| 2014/0216078 A1* | 8/2014 | Ladd | F25D 21/004 62/80 |
| 2014/0319232 A1 | 10/2014 | Gourlay et al. | |
| 2014/0359453 A1 | 12/2014 | Palfreeman | |
| 2014/0365019 A1 | 12/2014 | Gourlay et al. | |
| 2015/0051741 A1 | 2/2015 | Bruck et al. | |
| 2015/0100508 A1 | 4/2015 | Binion et al. | |
| 2015/0127174 A1 | 5/2015 | Quam et al. | |
| 2015/0167995 A1 | 6/2015 | Fadell et al. | |
| 2015/0261427 A1 | 9/2015 | Sasaki | |
| 2015/0308705 A1 | 10/2015 | Sloo et al. | |
| 2015/0338116 A1* | 11/2015 | Furuta | H04L 12/2818 700/276 |
| 2016/0189491 A1 | 6/2016 | Sloo et al. | |
| 2016/0201933 A1* | 7/2016 | Hester | F24D 19/1084 700/276 |
| 2016/0223215 A1* | 8/2016 | Buda | G05D 23/1904 |
| 2017/0074541 A1 | 3/2017 | Bentz et al. | |
| 2017/0082309 A1 | 3/2017 | Tanaka | |
| 2017/0211862 A1* | 7/2017 | Slack | F24D 12/00 |
| 2018/0195752 A1* | 7/2018 | Sasaki | F24F 11/46 |

OTHER PUBLICATIONS

U.S. Appl. No. 14/712,030, Golden et al.
U.S. Appl. No. 14/711,938, Golden et al.
U.S. Appl. No. 29/535,235, Golden et al.
U.S. Appl. No. 29/535,236, Golden et al.
U.S. Appl. No. 15/634,260, Khiani, et al.
Energy Efficient Smart Thermostat: Nest, designboom.com [online], published Oct. 26, 2011, [retrieved May 24, 2016], retrieved from the Internet <URL:http://www.designboom.com/technology/energyefficientsmartthermostatnest/>.
Lennox iComfort S30, contractingbusiness.com [online], published Mar. 13, 2015, [retrieved May 24, 2016], retrieved from the Internet <URL:http://contractingbusiness.com/residential-hvac/tech-update-

(56) References Cited

OTHER PUBLICATIONS march-2015-hydronics-home-automation#slide-0-field_images-32371>.

Nest Smart Thermostat, design-milk.com [online], published Oct. 25, 2011, [retrieved May 24, 2016], retrieved from the Internet <URL:http://design-milk.com/nest-smart-thermostat/>.

Innovative Retail Technologies; "Venstar ColorTouch Thermostats Now Feature Real-Time Weather, Remote Firmware Upgrades and Humidity Support";https://www.innovativeretailtechnologies.com/doc/venstar-colortouch-feature-real-time-weather-remote-firmware-support-0001; Jun. 13, 2013; 4 pages.

National Oceanic and Atmospheric Administration (NOAA); "National Digital Forecast Database (NDFD)"; https://www.ncdc.noaa.gov/data-access/model-data/model-datasets/national-digital-forecast-database-ndfd; Nov. 2015; 3 pages.

\* cited by examiner

METHOD AND SYSTEM FOR HEATING AUTO-SETBACK

BACKGROUND

Technical Field

The present invention relates generally to methods of operating a Heating, Ventilation, and Air Conditioning (HVAC) system and more particularly, but not by way of limitation, to a method of reducing energy consumption of an HVAC system.

History of Related Art

A thermostat is generally considered to be a device that regulates operation of mechanical, electrical, or electronic systems in relation to temperature. Thermostats are particularly prevalent in HVAC systems to maintain a temperature of an enclosed space at a set-point temperature. Simple thermostats allow a user to select a desired set-point temperature for the enclosed space and the thermostat instructs the HVAC system to maintain the desired set-point temperature. Simple thermostats rely upon user interaction to change the set-point temperature and cannot alter the set-point temperature autonomously. Some more complicated or "smart" thermostats can change the set-point temperature based upon a pre-determined schedule to change the set-point temperature, but these thermostats do not determine an optimal set-point temperature for a user.

BRIEF SUMMARY OF THE INVENTION

In a first aspect, the present invention relates to a method of operating an HVAC system. The method includes using a controller to predict a first predicted temperature of an enclosed space during an unoccupied time with the HVAC system off. The controller determines if the first predicted temperature is less than a set-point temperature. Responsive to a determination that the first predicted temperature is less than the set-point temperature, the controller predicts a second predicted temperature of the enclosed space if the HVAC system is operated for a first runtime. The controller determines if the second predicted temperature is less than the set-point temperature and, responsive to a determination that the second predicted temperature is not less than the set-point temperature, the controller operates the HVAC system for the first runtime.

In another aspect, the present invention relates to an HVAC system. The HVAC system includes a compressor configured to compress a refrigerant, an evaporator coil coupled to the compressor and configured to receive the refrigerant, a condenser coil coupled between the evaporator coil and the compressor, and a controller comprising a central processing unit and memory. The controller is configured to predict a first predicted temperature of an enclosed space during an unoccupied time with the HVAC system off. The controller determines if the first predicted temperature is less than a set-point temperature. Responsive to a determination that the first predicted temperature is less than the set-point temperature, the controller predicts a second predicted temperature of the enclosed space if the HVAC system is operated for a first runtime. The controller determines if the second predicted temperature is less than the set-point temperature and, responsive to a determination that the second predicted temperature is not less than the set-point temperature, the controller operates the HVAC system for the first runtime.

In another aspect, the present invention relates to a method of operating an HVAC system with a controller. The method includes determining if an enclosed space of the HVAC system is unoccupied. Responsive to a determination that the enclosed space is unoccupied, setting a heating demand to zero for an unoccupied time. The method includes predicting a first predicted temperature of the enclosed space during the unoccupied time with the HVAC system off and determining if the first predicted temperature is less than a set-point temperature. Responsive to a determination that the first predicted temperature is less than the set-point temperature, predicting a second predicted temperature of the enclosed space if the HVAC system is operated for a first runtime. The method includes determining if the second predicted temperature is less than the set-point temperature. Responsive to a determination that the second predicted temperature is less than the set-point temperature, operating the HVAC system for the first runtime. Responsive to a determination that the second predicted temperature is less than the set-point temperature, repeating, for an increased runtime, the step of predicting the second predicted temperature and the step of determining if the second predicted temperature is less than the set-point temperature.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

HVAC systems typically include a thermostat that regulates operation of mechanical, electrical, or electronic systems within the HVAC system to control a temperature of an enclosed space associated with the HVAC system. In practice, thermostats allow a set-point temperature to be specified by a user. The thermostat then modulates one or more of the mechanical, electrical, or electronic systems of the HVAC system to match the temperature of the enclosed space with the set-point temperature. Simple thermostats allow a user to select a desired set-point temperature for an enclosed space. For example, the enclosed space may be a home. While simple thermostats can be effective for controlling a temperature of the enclosed space, simple thermostats rely upon user interaction to change the set-point temperature and cannot alter the set-point temperature autonomously. Some more complicated or "smart" thermostats can change the set-point temperature based upon a pre-determined schedule. For example, a user may specify a first set-point temperature for night time and a second set-point temperature for day time.

Providing first and second set-point temperatures may be useful, for example, to reduce energy costs when the enclosed space is not occupied. During day time hours, the home may not be occupied. When the enclosed space is not occupied, there is no need to expend energy to maintain an elevated temperature within the enclosed space. To conserve energy, the second set-point temperature for day time hours can be set to a value below the first set-point temperature. While this approach can save energy, these smart thermostats do not determine optimal HVAC system parameters while the home is not occupied. Instead, smart thermostats rely upon a user to input the first and second set-point temperatures. The second set-point point temperature selected by the user is not determined by the HVAC system such that energy expenditure by the HVAC system is minimized. The instant HVAC system includes a HVAC controller that is configured to automatically determine optimized HVAC runtimes without user input.

Figure 1:
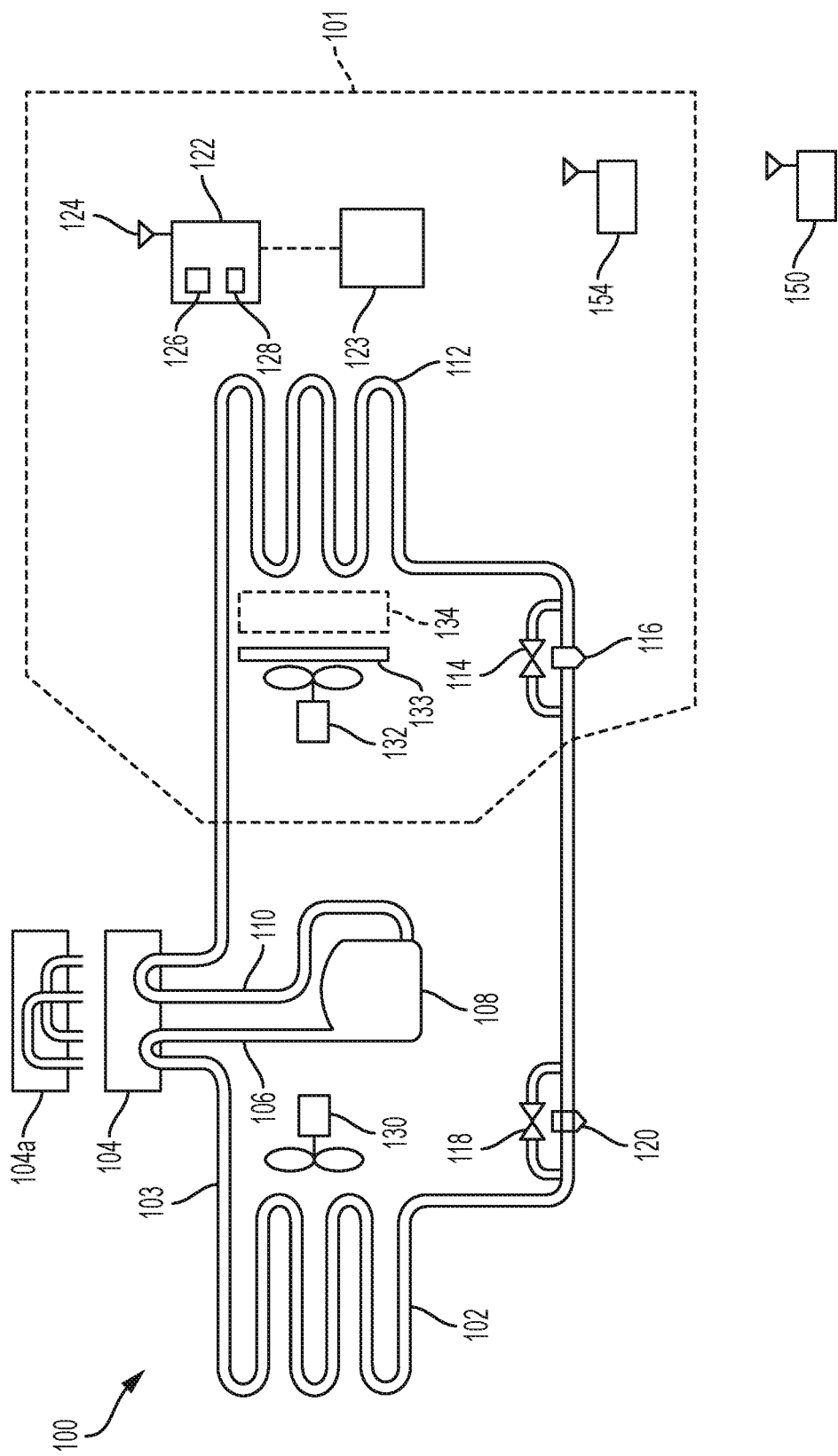
FIG. 1 is a schematic diagram of an illustrative HVAC system.

Referring now to FIG. 1, a schematic diagram of an illustrative HVAC system 100 is shown. The HVAC system 100 is configured to control a temperature within the enclosed space 101. To cool the enclosed space 101, the HVAC system 100 operates in an air-conditioning mode. To heat the enclosed space 101, the HVAC system 100 operates in a heat pump mode. For the purposes of the instant disclosure, the HVAC system 100 will be described relative to the heat pump mode. Heat pump systems typically include an exterior coil that operates as an evaporator coil and an interior coil that operates as a condenser coil. A person having skill in the art will appreciate that when heat pump systems operate in a defrost mode, the outdoor coil operates as a condenser coil and the indoor coil operates as an evaporator coil. For the purposes of this application, the term "evaporator coil" is used to refer to the exterior coil and the term "condenser coil" is used to refer to the interior coil irrespective of the operating mode being described unless specifically stated otherwise.

The HVAC system 100 includes an evaporator coil 102, a reversing valve 104, a compressor 108, and a condenser coil 112 that are coupled together to form a circuit through which a refrigerant may flow. The HVAC system 100 also includes a controller 122 that controls the operation of the components within the HVAC system 100. In an illustrative embodiment, the controller 122 comprises a computer that includes components for controlling and monitoring the HVAC system 100. For example, the controller 122 comprises a CPU 240 and a memory 250. In an illustrative embodiment, the controller 122 is in communication with a programmable intelligent thermostat 123 that allows a user to input a desired temperature for the enclosed space 101. The controller 122 may be an integrated controller or a distributed controller that directs operation of the HVAC system 100. In an illustrative embodiment, the controller 122 includes an interface to receive, for example, thermostat calls, temperature set-points, blower control signals, environmental conditions, and operating mode status for the HVAC system 100. In an illustrative embodiment, the environmental conditions may include indoor temperature and relative humidity of the enclosed space 101.

In some embodiments, the controller 122 can communicate with an external data source 150 via an antenna 124. In some embodiments, the controller 122 may use the antenna 124 to communicate with a router 154. The router 154 may be, for example, an internet access point that is connected to the Internet. The external data source 150 provides data regarding local environmental conditions to the controller 122 and may be, for example, an internet weather-data service. In an illustrative embodiment, the data from the external data source 150 may include: temperature, humidity, dew point temperature, forecast information, and the like. Forecast information can include predictions about future temperature, humidity, dew point temperature, and the like.

The refrigerant flows through the HVAC system 100 in a continuous heating cycle. Starting from the evaporator coil 102, an outlet 103 of the evaporator coil 102 is coupled to a suction line 106 of the compressor 108 via the reversing valve 104 to feed the refrigerant to the compressor 108. The compressor 108 compresses the refrigerant. A discharge line 110 feeds compressed refrigerant from the compressor 108 through the reversing valve 104 to the condenser coil 112. In the heat pump configuration, refrigerant traveling from the condenser coil 112 flows through a first bypass valve 114, avoiding a first throttling valve 116 that is in the closed position, and is directed to the evaporator coil 102. Just before the refrigerant enters the evaporator coil 102, the refrigerant passes through a second throttling valve 120, avoiding a second bypass valve 118 that is in a closed position. The second throttling valve 120 reduces a pressure of the refrigerant as it enters the evaporator coil 102 and the heating cycle begins again. The behavior of the refrigerant as it flows through the HVAC system 100 is discussed in more detail below.

During operation of the HVAC system 100, low-pressure, low-temperature refrigerant is circulated through the evaporator coil 102. The refrigerant is initially in a liquid/vapor state. In an illustrative embodiment, the refrigerant is, for example, R-22, R-134a, R-410A, R-744, or any other suitable type of refrigerant as dictated by design requirements. Ambient air from the environment surrounding the evaporator coil 102, which is typically warmer than the refrigerant in the evaporator coil, is circulated around the evaporator coil 102 by an exterior fan 130. In an illustrative embodiment, the refrigerant begins to boil after absorbing heat from the ambient air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant leaving the evaporator coil 102 is fed into the reversing valve 104 that, in the heat pump mode, directs the refrigerant into the compressor 108 via the suction line 106. In an illustrative embodiment, the compressor 108 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant leaves the compressor 108 via the discharge line 110 and enters the reversing valve 104 that, in the heat pump mode, directs the refrigerant to the condenser coil 112.

Air from the enclosed space 101 is circulated around the condenser coil 112 by an interior fan 132. The air from the enclosed space 101 is typically cooler than the high-pressure, high-temperature, superheated vapor refrigerant present in the condenser coil 112. Thus, heat is transferred from the high-pressure, high-temperature, superheated vapor refrigerant to the air from the enclosed space 101. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 112 and passes through the first bypass valve 114. The first throttling valve 116 is in the closed position while the heat pump system operates as a heat pump. Just before the high-pressure, high-temperature, sub-cooled liquid refrigerant enters the evaporator coil 102, the high-pressure, high-temperature, sub-cooled liquid refrigerant passes through the second throttling valve 120.

The second throttling valve 120 abruptly reduces the pressure of the high-pressure, high-temperature, sub-cooled liquid refrigerant and regulates an amount of refrigerant that travels to the evaporator coil 102. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as "flash evaporation." The flash evaporation lowers the temperature of the resulting liquid/vapor refrigerant mixture to a temperature lower than a temperature of the ambient air. The liquid/vapor refrigerant mixture leaves the second throttling valve 120 and returns to the evaporator coil 102, and the cycle begins again. This cycle continues as needed or until the HVAC system 100 determines that a defrost cycle needs to be run to remove frost that has built up on the evaporator coil 102.

As shown in FIG. 1, the HVAC system 100 is operating as a heat pump to provide heat to the enclosed space 101. However, in order to defrost the evaporator coil 102, the HVAC system 100 is configured to operate in the defrost mode. To initiate the defrost mode, the controller 122 reverses the flow of the refrigerant through the HVAC system 100 to cause the evaporator coil 102 to act as a condenser coil and to cause the condenser coil 112 to act as an evaporator coil. Repurposing the evaporator coil to act as a condenser coil causes the temperature of the evaporator coil 102 to increase, thereby melting any frost that has accumulated on the evaporator coil 102. To operate the HVAC system 100 in the defrost mode, the controller 122: 1) switches the reversing valve 104 to the valve configuration illustrated as reversing valve 104a to reverse the flow direction of the refrigerant through the HVAC system 100; 2) closes the first bypass valve 114 and opens the first throttling valve 116; and 3) closes the second throttling valve 120 and opens the second bypass valve 118. So configured, the HVAC system 100 provides warm refrigerant to the evaporator coil 102 to melt frost from the evaporator coil 102. However, with the condenser coil 112 operating as an evaporator coil, the air blown over the condenser coil 112 by the interior fan 132 is cooled by the condenser coil 112, which now has cold refrigerant passing therethrough. To counter this cooling effect, a heating element 133 is activated to warm the air. In an illustrative embodiment, the heating element 133 is a resistive heating element. In other embodiments, the heating element 133 may comprise other devices that permit air passing around the heating element 133 to be warmed. In some embodiments, the HVAC system 100 may include a furnace 134 that is configured to provide heat to the enclosed space 101. The furnace 134 is illustrated in FIG. 1 with a dashed outline to indicate it is an optional component. The furnace 134 may be a gas powered furnace or an electric furnace. In some embodiments, the furnace 134 includes the heating element 133.

Figure 2:
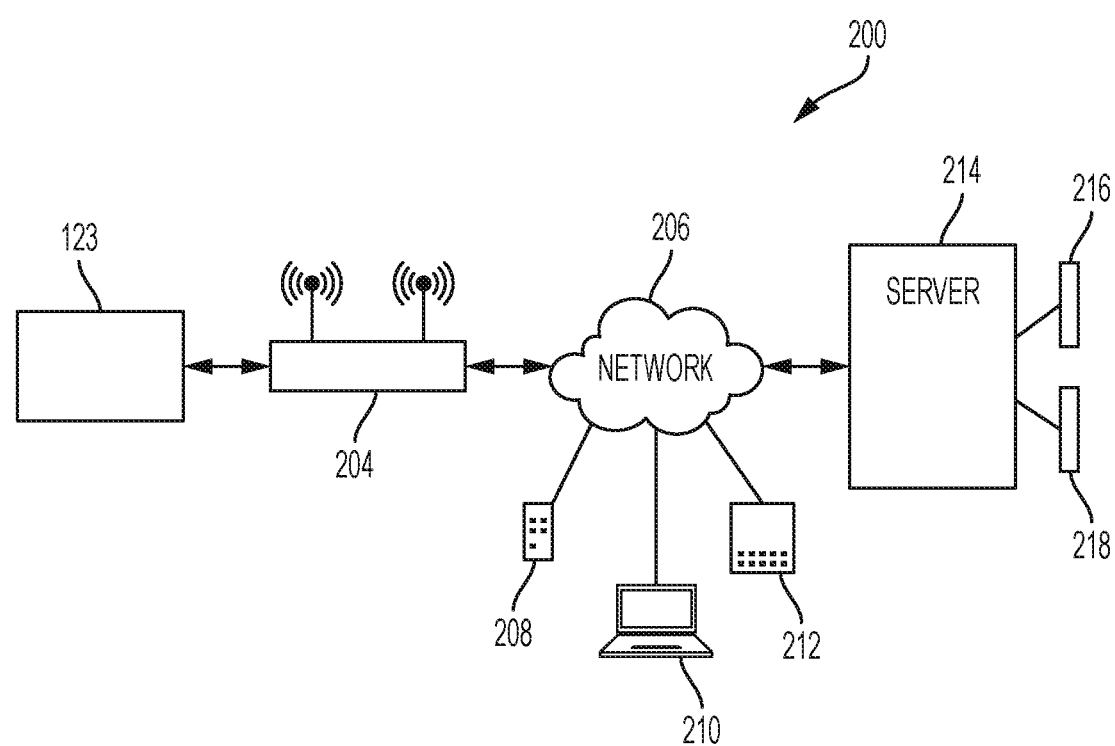
FIG. 2 is a schematic view illustrating a smart home environment system.

Referring now to FIG. 2, a schematic view illustrating a smart home environment system 200 is shown. The smart home environment system 200 integrates with the HVAC system 100 and includes the programmable intelligent thermostat 123, a networking device 204, a plurality of communication devices 208, 210, 212, and at least one server or cloud-computing system 214. The networking device 204, the plurality of communication devices 208, 210, 212, and the at least one server or cloud-computing system 214 are each communicably coupled to a network 206. The network 206 can include any number of wired and/or wireless communications networks such as, for example, public or private intranets, a wide area network (e.g., the Internet), cellular networks, satellite communication, and the like.

In an illustrative embodiment, the networking device 204 serves as networking equipment that, for example, routes/forwards traffic between two or more networks or sub-networks and/or provides access to a network. For example, the networking device 204 allows the programmable intelligent thermostat 123 to communicate with the at least one server or cloud-computing system 214 via the network 206. In an illustrative embodiment, the networking device 204 can include, for example, routers, switches, bridges, hubs, wireless access points, gateways, a combination of same, and/or the like. In an illustrative embodiment, the networking device 204 is further configured to communicate with home communication equipment such as, for example, home routers, wireless hubs, access points, and the like. In an illustrative embodiment, the at least one server or cloud-computing system 214 may be associated with a manufacturer, a support entity, a service provider, and the like. The at least one server or cloud-computing system 214 is configured to communicate with other entities such as, for example, maintenance contractors 216, weather forecasting agencies 218, and the like.

The smart home environment system 200 allows users to contact customer support using, for example, the programmable intelligent thermostat 123. Additionally, the smart home environment system 200 allows software updates to be routinely sent from the at least one server or cloud-computing system 214 to at least one of the programmable intelligent thermostat 123 and other HVAC system components such as, for example, outdoor-unit control board, furnace control board, and the like. Furthermore, the smart home environment system 200 allows maintenance reminders and notifications to be routinely sent from the at least one server or cloud-computing system 214 to the programmable intelligent thermostat 123. In addition, via the smart home environment system 200, the at least one server or cloud-computing system 214 forwards current and predicted weather information to the programmable intelligent thermostat 123.

In an illustrative embodiment, the plurality of communication devices 208, 210, 212 operated by users are configured to control the programmable intelligent thermostat 123 remotely. A webpage or application may be configured to receive information from the user operated plurality of communication devices 208, 210, 212 and control settings of, for example, the programmable intelligent thermostat 123. For example, the user can view temperature settings of the programmable intelligent thermostat 123 and modify the settings using the plurality of communication devices 208, 210, 212. In an illustrative embodiment, the plurality of communication devices 208, 210, 212 may be, for example, a personal computer (e.g., desktop or laptop), tablet computer, mobile device (e.g., personal digital assistant (PDA) or smart phone), and the like.

Figure 3A:
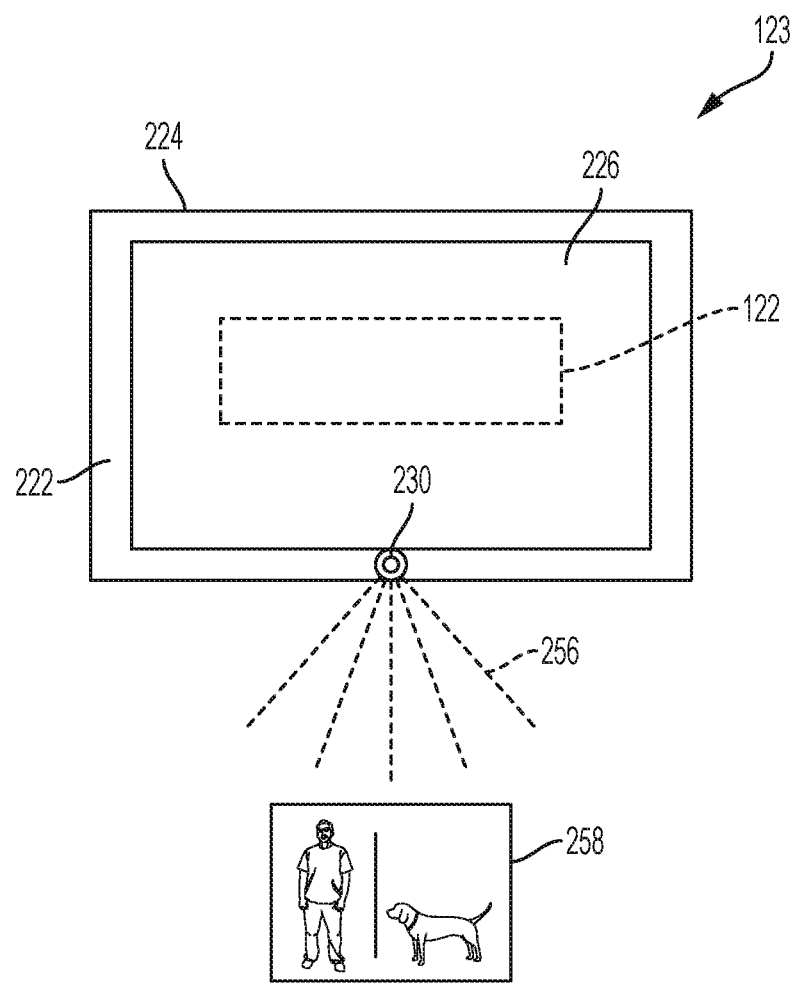
FIG. 3A illustrates an exemplary programmable intelligent thermostat.

FIG. 3A illustrates an exemplary programmable intelligent thermostat 123. The programmable intelligent thermostat 123 includes a front housing 222 and a rear housing 224. The rear housing 224 is removably attached to a wall via fasteners (not illustrated), such as, for example, screws, nuts, snaps, pins, and the like. The front housing 222 includes a display 226, the controller 122, and at least one sensor 230 embedded therein. In an illustrative embodiment, the at least one sensor 230 may be, for example, a sensor that is configured to detect presence of nearby objects. In one embodiment, a proximity sensor is incorporated in the programmable intelligent thermostat 123 to detect whether the home is occupied. In another embodiment, a light sensor is incorporated in the programmable intelligent thermostat 123 to detect room lighting. In yet another embodiment, a singular sensor such as, for example, a video camera is incorporated in the programmable intelligent thermostat 123 to perform operations such as, for example, room lighting determination, distance determination, facial detection, voice recognition, occupancy detection, and the like.

In an illustrative embodiment, the display 226 may be any type of visual input/output configured to display one or more characters and/or receive input corresponding to one or more characters. In addition, the display 226 may be configured to display, for example, diagrams, pictures, words, characters, animations, and the like. The display 226 may further be configured to receive input corresponding to one or more diagrams, pictures, words, characters, and the like. In some embodiments, the display 226 may be, for example, a customizable color touch-screen display and may be configured to display respective representations of the keyboard (e.g., a virtual keyboard). In some embodiments, the display 226 may function as, for example, a user interface for receiving user inputs. For exemplary illustration, the programmable intelligent thermostat 123 as illustrated in FIG. 2A is rectangular in shape; however, in other embodiments, the programmable intelligent thermostat 123 may be of various shapes and sizes as needed.

Figure 3B:
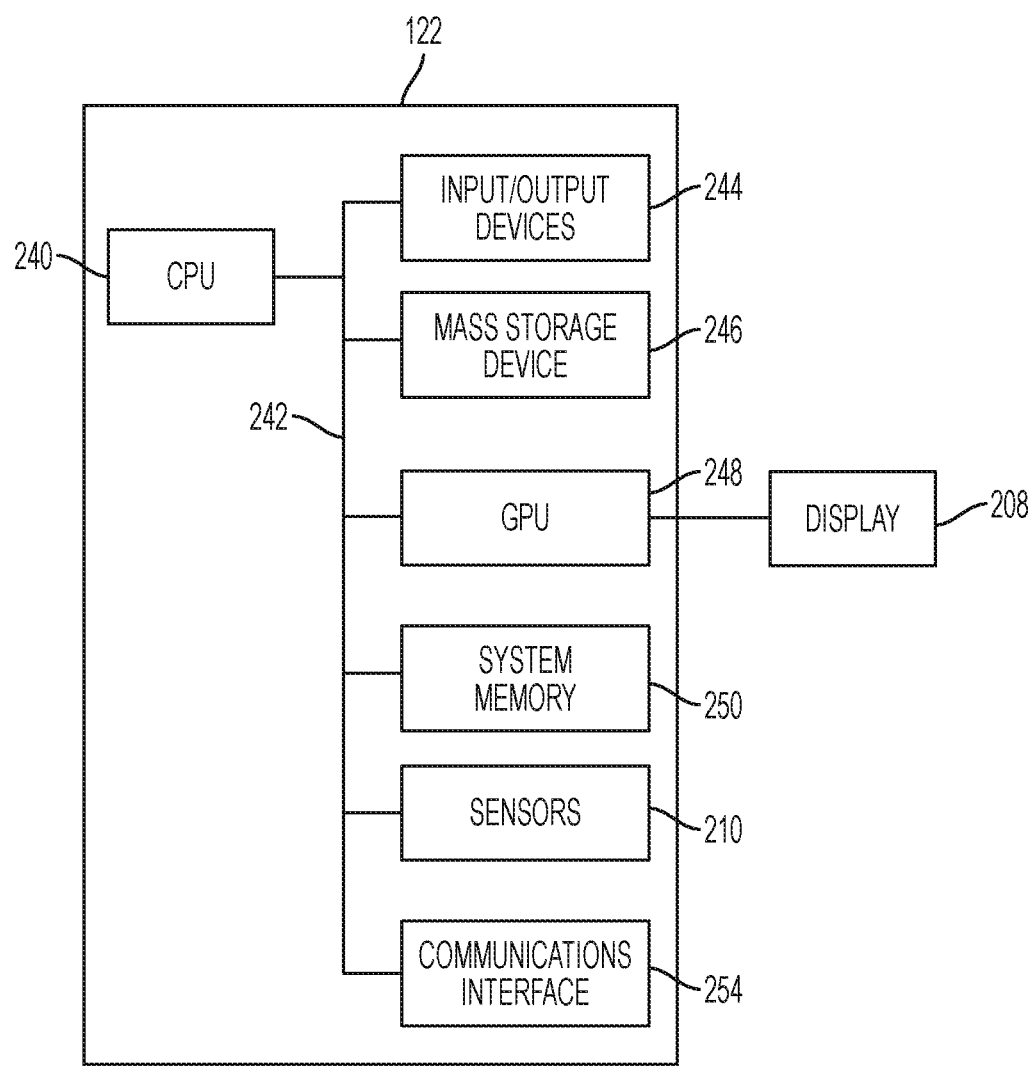
FIG. 3B is a schematic view illustrating a controller of the exemplary programmable intelligent thermostat of FIG. 3A.

FIG. 3B is a schematic view illustrating the controller 122 of the thermostat 123. For illustrative purposes, the controller 122 will be described relative to FIGS. 1-2A. The controller 122 includes a CPU 240 connected to a bus 242. The bus 242 serves as a connection channel between the CPU 240 and various components of the programmable intelligent thermostat 123. The bus 242 may include any combination of hardware, software embedded in a computer readable medium, and/or encoded logic incorporated in hardware or otherwise stored (e.g., firmware) to couple components of the controller 122 to each other. As an example and not by way of limitation, the bus 242 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. The bus 242 may include any number, type, and/or configuration of buses 242, where appropriate. In particular embodiments, one or more buses 242 (which may each include an address bus and a data bus) may couple the CPU 240 to other components of the controller 122.

User input/output devices 244 are coupled to the CPU 240. Examples of input/output devices 244 may include, for example, touchscreens, pointing trackballs, trackpads, and a variety of other input/output devices. Programs and data are stored on a mass storage device 246 coupled to the CPU 240.

As an example and not by way of limitation, the mass storage device 246 may include a hard disk drive (HDD), a floppy disk drive, flash memory, an optical disc, a magneto-optical disc, magnetic tape, or a Universal Serial Bus (USB) drive or a combination of two or more of these. The mass storage device 246 may include removable or non-removable (or fixed) media, where appropriate. The mass storage device 246 may be internal or external to the programmable intelligent thermostat 123, where appropriate. In particular embodiments, the mass storage device 246 may be non-volatile, solid-state memory. In particular embodiments, the mass storage device 246 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The mass storage device 246 may take any suitable physical form and may comprise any suitable number or type of storage. The mass storage device 246 may include one or more storage control units facilitating communication between the CPU 240 and the mass storage device 246, where appropriate.

The display 226 is coupled to the CPU 240 by a graphics processing unit (GPU) 248. The memory 250 is coupled to the CPU 240 to provide the CPU 240 with fast storage to facilitate execution by the CPU 240. The memory 250 may be any form of volatile or non-volatile memory including, without limitation, magnetic media, optical media, random access memory (RAM), read-only memory (ROM), flash memory, removable media, or any other suitable local or remote memory component or components. In particular embodiments, the memory 250 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The memory 250 may store any suitable data or information, including software embedded in a computer readable medium, and/or encoded logic incorporated in hardware or otherwise stored (e.g., firmware). In particular embodiments, the memory 250 may include main memory for storing instructions for the CPU 240 to execute or data for the CPU 240 to operate on.

The at least one sensor 230 is coupled to the CPU 240 and provides information to the CPU 240. The information may include data relative to, for example, occupancy detection, temperature measurements, light measurements, proximity detection, and the like. The controller 122 also includes a communications interface 254. In an illustrative embodiment, the communications interface 254 may include hardware, encoded software, or both providing one or more interfaces for communication (such as, for example, packet-based communication) among any networks, any network devices, and/or any other computer systems. As an example and not by way of limitation, the communications interface 254 may include a network-interface controller (NIC) or network adapter for communicating with an Ethernet or other wire-based network and/or a wireless NIC (WNIC) or wireless adapter for communicating with a wireless network.

In one embodiment, the at least one sensor 230 is a proximity sensor that detects whether the home is occupied. In another embodiment, a light sensor is incorporated in the programmable intelligent thermostat 123 to detect room lighting and/or occupancy detection. In yet another embodiment, a singular sensor such as, for example, a video camera, is incorporated in the programmable intelligent thermostat 123 to perform operations such as, for example, room lighting determination, distance determination, facial detection, voice recognition, occupancy detection, and the like.

Depending on the embodiment, the communications interface 254 may be any type of interface suitable for any type of network for which the programmable intelligent thermostat 123 is used. As an example and not by way of limitation, the programmable intelligent thermostat 123 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the programmable intelligent thermostat 123 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the communications interface 254 can utilize communication via various other types of wireless communication such as infrared (IR) communication, radio frequency (RF) communication, communication via direct electrical connections, etc. In general, the controller 122 may include any suitable communications interface 254 for any one or more of these networks, where appropriate.

In an illustrative embodiment, the CPU 240 may be a microprocessor, controller, or any other suitable computing device, resource, or combination of hardware, software and/or encoded logic operable to execute, either alone or in conjunction with other components, (e.g., the memory 250). Such functionality may include providing various features discussed herein. In particular embodiments, the CPU 240 may include hardware for executing instructions. As an example and not by way of limitation, to execute instructions, the CPU 240 may retrieve (or fetch) instructions from an internal register, an internal cache, the memory 250, or the mass storage device 246; decode and execute them; and then write one or more results to an internal register, an internal cache, the memory 250, or the mass storage device 246.

In an illustrative embodiment, the at least one sensor 230 is configured to emit electromagnetic field or a beam of electromagnetic radiation 256. The at least one sensor 230 looks for changes in the field or return signal caused by movement of, for example, an occupant 258. The occupant 258 may be, for example, a human or a pet. In other embodiments, the at least one sensor 230 is configured to detect an approaching occupant 258 by infrared light reflection. In other embodiments, the at least one sensor 230 is configured to perform facial recognition of the occupant 258 to distinguish between a human and a pet. In an illustrative embodiment, information from the at least one sensor 230 is used to determine whether an occupant 258 is present. In addition, information from the at least one sensor 230 is used to determine, for example, distance of the occupant 258 from the programmable intelligent thermostat 123, size of the occupant 258, whether the occupant 258 is a human or pet, and the like. In some embodiments, based upon the determination, various components of the programmable intelligent thermostat 123 are automatically adjusted. In other embodiments, based upon the determination, the programmable intelligent thermostat 123 automatically adjusts heating or cooling operation of the HVAC system to conserve energy. In some embodiments, the HVAC system may adjust heating or cooling differently depending on whether a human or a pet has been detected. For example, if no movement has occurred, the programmable intelligent thermostat 123 is automatically powered off.

Figure 4:
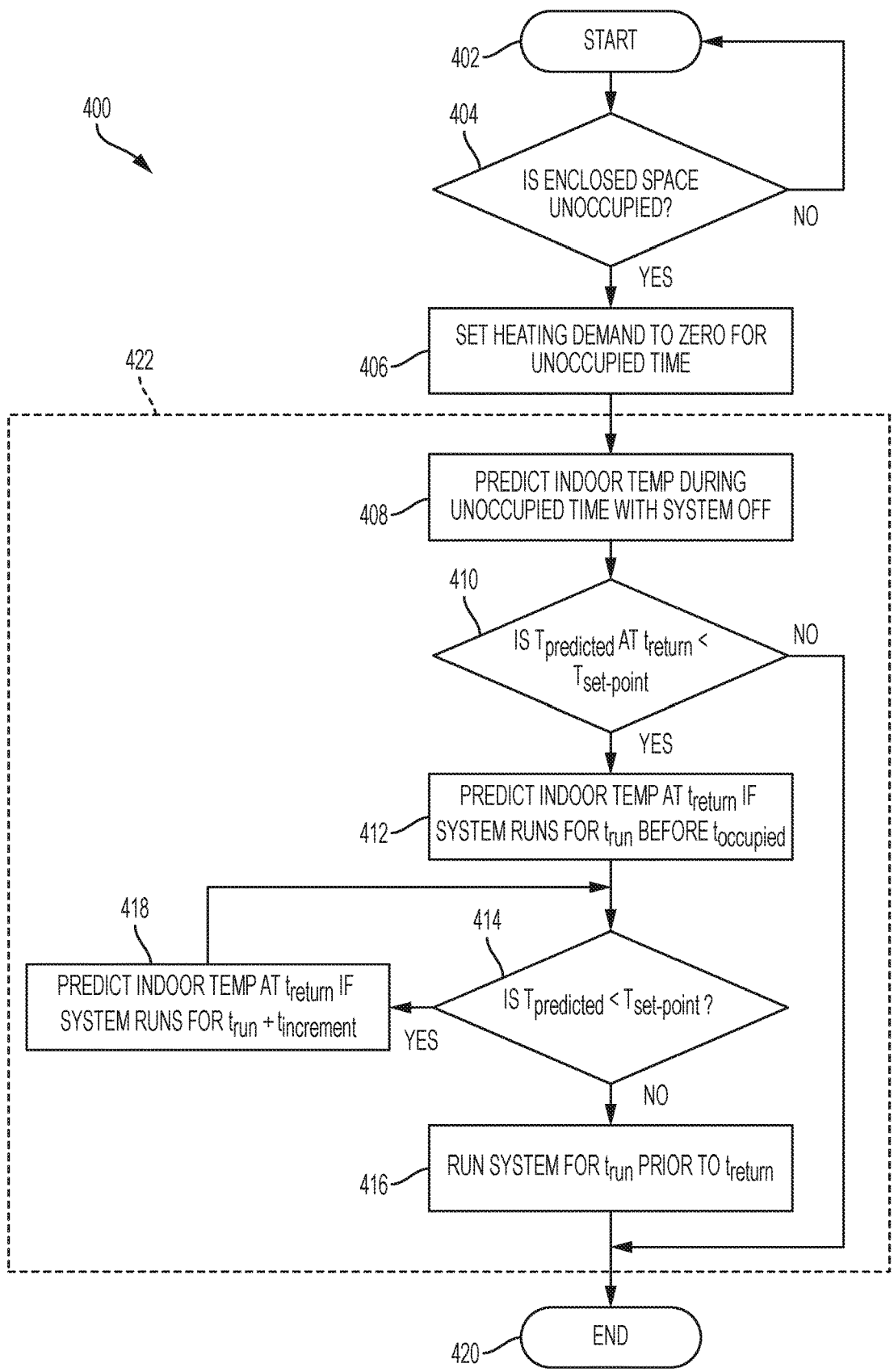
FIG. 4 is a flow diagram illustrating a process of controlling an HVAC system.

FIG. 4 is a flow chart illustrating an exemplary process 400 for controlling the HVAC system 100. For purposes of illustration, FIG. 4 will be discussed herein relative to FIGS. 1-3B. The process 400 may be used to conserve energy while the enclosed space 101 is unoccupied. In particular, the process 400 may be used to control heating of the enclosed space 101 in an effort to reduce energy costs. For example, the enclosed space 101 may represent a home of a user. While the user is away from the enclosed space 101, the process 400 monitors parameters of the HVAC system 100 and the enclosed space 101 to limit unnecessary heating of the enclosed space 101. An example of unnecessary heating includes heating the enclosed space 101 to maintain a set-point temperature when the user is away from the enclosed space 101. Prior to leaving the enclosed space 101, the user may have instructed the HVAC system 100 via the thermostat 123 to maintain set-point temperature of 70° F. Without intervention, the HVAC system 100 would operate to maintain the set-point temperature of 70° F. while the user is away. The energy used to maintain the set-point temperature of 70° F. is unnecessary because the enclosed space 101 is unoccupied, and thus there is no need to maintain the set-point temperature of 70° F. The process 400, described in detail below, controls the HVAC system 100 when the enclosed space 101 is unoccupied to reduce energy consumption by the HVAC system 100.

The process 400 begins at step 402. At step 404, the controller 122 determines if the enclosed space 101 is unoccupied. If it is determined at step 404 that the enclosed space 101 is occupied, the process 400 returns to step 402. In some embodiments, the controller 122 may wait for a period of time ($t_{wait}$) before proceeding back to step 404. For example, the controller 122 may wait for fifteen minutes before proceeding back to step 404.

If it is determined at step 404 that the enclosed space 101 is unoccupied, the process 400 proceeds to step 406. In some embodiments, the determination in step 404 is made relative to parameters input by the user. For example, the controller 122 may be programmed with an unoccupied time ($t_{unoccupied}$) that indicates a period of time that the user is away from the enclosed space 101. By way of example, the user may input to the controller 122 that the unoccupied time ($t_{unoccupied}$) is between 8:00 AM and 5:00 PM while the user is away. At 8:00 AM, an instruction is executed by the controller 122 indicating that the enclosed space 101 is unoccupied and the process 400 proceeds to step 406.

In other embodiments, other methodologies may be used to indicate that the enclosed space 101 is unoccupied. For example, the controller 122 may utilize the at least one sensor 230 to determine if the enclosed space 101 is unoccupied. The at least one sensor 230 may include a motion sensor that monitors the enclosed space 101 for movement. If no movement is detected for a period of time, the controller 122 determines that the enclosed space 101 is unoccupied and the process 400 proceeds to step 406. In some embodiments, the at least one sensor 230 includes at least one sensor located remotely from the controller 122. For example, the at least one sensor located remotely from the controller 122 may be a motion sensor disposed in the enclosed space 101. The motion sensor may be part of a home security system that communicates with the controller 122.

At step 406, the controller 122 sets a heating demand for the HVAC system 100 to zero to shut off the HVAC system 100 while the enclosed space 101 is unoccupied. In some embodiments, the controller 122 sets a minimum temperature that the enclosed space 101 is allowed to reach during the unoccupied time ($t_{unoccupied}$). For example, in very cold ambient temperatures with the heating demand set to zero, the enclosed space 101 may drop to an unacceptably low value. The unacceptably low value can vary based upon a particular enclosed space 101. In some embodiments, the unacceptably low value may be based upon considerations of non-human occupants of the home (e.g., pets and plants). For example, if a pet occupies the enclosed space 101 while the user is away from the enclosed space 101, the user may wish to specify a minimum temperature of 65° F. for the HVAC system 100 to maintain during the unoccupied time ($t_{unoccupied}$). Without intervention and in very cold ambient temperatures, the temperature of the enclosed space 101 may fall to a temperature below 65° F. while the HVAC system is off. To prevent the enclosed space 101 from falling to temperatures that are too cold, a minimum temperature of 65° F. may be set. The minimum temperature may be a value set to any value desired by the user. After the heating demand has been set to zero, the process 400 proceeds to step 408.

At step 408 the controller 122 predicts a temperature ($T_{predicted}$) of the enclosed space 101 during the unoccupied time ($t_{unoccupied}$) with the HVAC system 100 powered off. In some embodiments, the temperature of the enclosed space 101 is predicted using historical temperature data. Historical temperature data can be stored in either or both of the mass storage device 246 and the memory 250. In some embodiments, the temperature of the enclosed space 101 is predicted using at least one of real-time weather data and weather forecast data. The real-time weather data and/or weather forecast data may be obtained from the external data source 150, such as a weather service, via the network 206. After the controller 122 predicts the temperature in step 408, the process 400 proceeds to step 410.

At step 410, the controller 122 determines if the predicted temperature ($T_{predicted}$) at a return time ($t_{return}$) of the occupant is less than a set-point temperature ($T_{set-point}$). If it is determined at step 410 that the predicted temperature ($T_{predicted}$) is greater than or equal to the set-point temperature ($T_{set-point}$), no heating is necessary to raise the temperature of the enclosed space 101 to the set-point temperature ($T_{set-point}$) and the process 400 ends at step 420. By way of example, no heating may be necessary because ambient conditions are such that the enclosed space 101 reaches the set-point temperature ($T_{set-point}$) without intervention by the HVAC system 100. For example, ambient temperatures in the morning may be well below the set-point temperature ($T_{set-point}$), but, by the afternoon, the ambient temperatures may have risen to a temperature at or above the set-point temperature ($T_{set-point}$). However, if it is determined at step 410 that the predicted temperature ($T_{predicted}$) is less than the set-point temperature ($T_{set-point}$), some intervention by the HVAC system 100 is needed to raise the temperature of the enclosed space 101 to the set-point temperature ($T_{set-point}$) and the process 400 proceeds to step 412.

At step 412, the controller 122 predicts a new temperature of the enclosed space 101 if the HVAC system 100 is operated for a runtime ($t_{setback}$) prior to the occupant returning to the enclosed space 101 (e.g., occupied time ($t_{occupied}$)). The runtime ($t_{setback}$) relates to an amount of time or setback that the HVAC system 100 runs prior to the user coming back to the enclosed space 101. The runtime ($t_{set-back}$) may be set to any amount of time. In some embodiments, the runtime ($t_{setback}$) is set to approximately fifteen minutes. By way of example, $T_{predicted}$ may be 60° F., $t_{setback}$ may be fifteen minutes, $T_{set-point}$ may be 70° F., and $t_{occupied}$ is 5:00 PM. The controller 122 determines the new predicted temperature if the HVAC system 100 is operated for fifteen minutes prior to 5:00 PM. After the new predicted temperature is determined, the controller 122 sets the value of the predicted temperature ($T_{predicted}$) to the value of the new predicted temperature and the process 400 proceeds to step 414.

At step 414, the controller 122 determines if the predicted temperature ($T_{predicted}$) is less than the set-point temperature ($T_{set-point}$). If it is determined at step 414 that the predicted temperature ($T_{predicted}$) is greater than or equal to the set-point temperature ($T_{set-point}$), the process 400 proceeds to step 416. At step 416, the HVAC system 100 waits to run until the end of the runtime ($t_{setback}$) coincides with the return time ($t_{return}$) and then the HVAC system 100 runs for the runtime ($t_{setback}$). For example, if the runtime ($t_{setback}$) is fifteen minutes and the return time ($t_{return}$) is 5:00 PM, the HVAC system 100 waits until 4:45 PM to begin running and runs until 5:00 PM. Following this method, the enclosed space 101 reaches the set-point temperature ($T_{set-point}$) by the time the user returns at 5:00 PM.

If it is determined at step 414 that the predicted temperature ($T_{predicted}$) is less than the set-point temperature ($T_{set-point}$), the process 400 proceeds to step 418. At step 418, the controller 122 predicts a new temperature of the enclosed space 101 for a longer runtime. In some embodiments, the longer runtime is equal to the runtime ($t_{setback}$) plus a time increment ($t_{increment}$). The value of the time increment ($t_{increment}$) may be any increment of time. In some embodiments, the value of the time increment ($t_{increment}$) is five minutes. In other embodiments the value of the time increment ($t_{increment}$) may be shorter or longer than five minutes. By way of example, if the runtime ($t_{setback}$) is fifteen minutes and the time increment ($t_{increment}$) is five minutes, the controller 122 predicts the new temperature of the enclosed space 101 if the HVAC system 100 runs for twenty minutes. The controller 122 then sets the value of the predicted temperature ($T_{predicted}$) to the value of the new predicted temperature. After the predicted temperature ($T_{predicted}$) is determined, the process 400 returns to step 414 where the controller 122 again checks to see if the predicted temperature ($T_{predicted}$) is less than the set-point temperature ($T_{set-point}$).

If it is determined at step 414 that the predicted temperature ($T_{predicted}$) is greater than or equal to the set-point temperature ($T_{set-point}$), the process 400 proceeds to step 416. If it is determined at step 414 that the predicted temperature ($T_{predicted}$) is less than the set-point temperature ($T_{set-point}$), the process 400 again proceeds to step 418 where the runtime ($t_{setback}$) is increased. The loop between steps 414 and 418 may be repeated until either the predicted temperature ($T_{predicted}$) is greater than or equal to the set-point temperature ($T_{set-point}$) or the runtime ($t_{setback}$) exceeds the amount of unoccupied time. For example, if the user is gone between 8:00 AM and 5:00 PM, and the process 400 has iterated steps 414 and 418 such that the runtime ($t_{setback}$) is greater than or equal to nine hours, the controller 122 determines that the HVAC system 100 must remain on during the unoccupied time ($t_{unoccupied}$) in order to have the enclosed space 101 at the set-point temperature ($T_{set-point}$) when the user returns.

In some embodiments, the controller 122 predicts temperatures in steps 412 and 418 in part based upon a type of heat source the HVAC system 100 uses to heat the enclosed space 101. In some embodiments, the HVAC system 100 provides heat to the enclosed space 101 by operating as a heat pump. In some embodiments, the HVAC system 100 provides heat to the enclosed space 101 via the heating element 133. In some embodiments, the HVAC system 100 provides heat to the enclosed space 101 via the furnace 134. In embodiments where the HVAC system 100 can provide heat by more than one heating system, the controller 122 can decide which one or what combination (in terms of time) of the heating systems to use based on efficiency and cost. For example, if the HVAC system 100 is capable of providing heat to the enclosed space 101 by a heat pump and a furnace, the controller 122 can decide which system to use for heating, how long, and when based on the costs of operating and the target setpoint. For example, the cost per minute to operate the HVAC system 100 as a heat pump or a furnace can be determined based upon an average energy consumption data. Energy consumption data can include cost of electricity, gas, and the like. Information regarding average energy consumption can be programmed into the controller 122 or received from external data source 150. The controller 122 determines whether it is more efficient to operate only the heat pump, only the furnace, or a combination of the two. Similarly, if the HVAC system 100 is capable of providing heat by a heat pump and an electric heating element, the controller 122 can decide which system (or both systems at the same time) to use based on efficiency and reaching the target setpoint.

In heat pump embodiments, the HVAC system 100 may provide heat to the enclosed space 101 solely via heat pump operation or may provide heat via a combination of heat pump operation and electric heat provided by the heating element 133. When providing heat to the enclosed space 101 by operating the HVAC system 100 as a heat pump, the controller 122 may predict the temperature with the heat pump operating at different speeds. For example, the heat pump may be run at a minimum speed and a maximum speed. Operating the heat pump at its minimum speed provides more efficiency. The controller 122 selects the minimum speed that achieves the set-point temperature ($T_{set-point}$). For example, if both the minimum and maximum heat pump speeds can achieve the set-point temperature ($T_{set-point}$), the controller 122 selects the minimum speed. In some embodiments, heat-pump operation may be supplemented with the heating element 133 to provide additional heat to the enclosed space as necessary (e.g., if heat-pump operation cannot raise the temperature to a desired value).

In some embodiments, heat-pump operation may be supplemented with the furnace 134 to provide additional heat to the enclosed space. The controller 122 can determine what an optimum speed for the heat pump to operate in combination with the furnace 134 to provide the most efficient heat to the enclosed space 101 while at the same time achieving the set-point temperature.

In some embodiments, the HVAC system 100 provides heat to the enclosed space 101 using only the furnace 134. In this embodiment, the controller 122 runs the furnace 134 at a maximum capacity of the furnace 134 to heat the enclosed space 101 as quickly as possible.

In some embodiments, the HVAC system 100 can operate in a defrost mode to defrost the evaporator coil 102 without also operating the heating element 133. During typical operation of a heat pump, frost or ice can form on the evaporator coil 102. To remove ice from the evaporator coil 102, a typical HVAC system operates in a defrost mode that supplies compressed refrigerant to the evaporator coil 102 to heat the evaporator coil 102 to melt frost that has formed thereon. Operating a typical HVAC system in a defrost mode causes cold air to be blown into the enclosed space 101. To combat the cold air that would otherwise be blown into the enclosed space 101, the typical HVAC system operates the heating element 133 to warm the air. However, when the enclosed space 101 is unoccupied, the HVAC system 100 of the instant disclosure can disable the heating element 133 during defrost when the enclosed space 101 is unoccupied because blowing some cold air into the enclosed space 101 is acceptable when there are no users in the enclosed space 101. Disabling the heating element 133 reduces energy consumption of the HVAC system 100.

In some embodiments, the process 400 may repeat the steps within the dashed box 422. Repeating the steps within the dashed box 422 throughout the day updates predicted temperature data and allows adjustments to be made in the event that ambient conditions have changed. For example, temperature predictions from earlier in the day may become incorrect because actual ambient temperature differs from predicted ambient temperatures. By periodically repeating the steps within the dashed box 422 throughout the day, the process 400 can more accurately predict temperatures within the enclosed space 101 to ensure that the temperature of the enclosed space 101 at the return time ($t_{return}$) reaches the set-point temperature ($T_{set-point}$). The steps within dashed box 422 may be repeated any number of times during the unoccupied time. In some embodiments, the steps within dashed box 422 are repeated periodically at preset intervals (e.g., every fifteen minutes). In some embodiments, the steps within dashed box 422 are repeated based upon updated weather data from the external data source 150. For example, the external data source 150 may provide updated weather information to the controller 122. Once the updated weather information is received, the controller 122 repeats the steps within dashed box 422.

Working Examples

Figure 5:
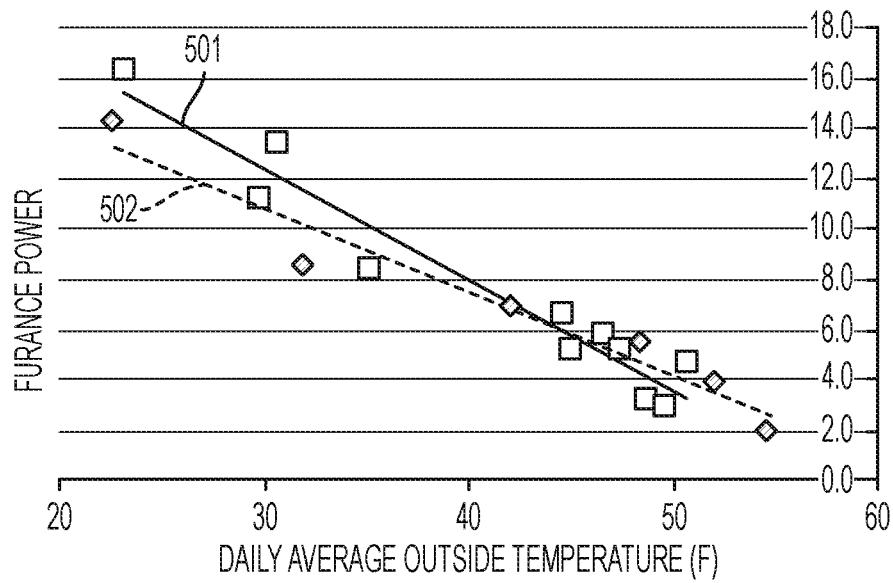
FIGS. 5 and 6 are charts illustrating energy savings of HVAC systems utilizing the exemplary process.
Figure 6:
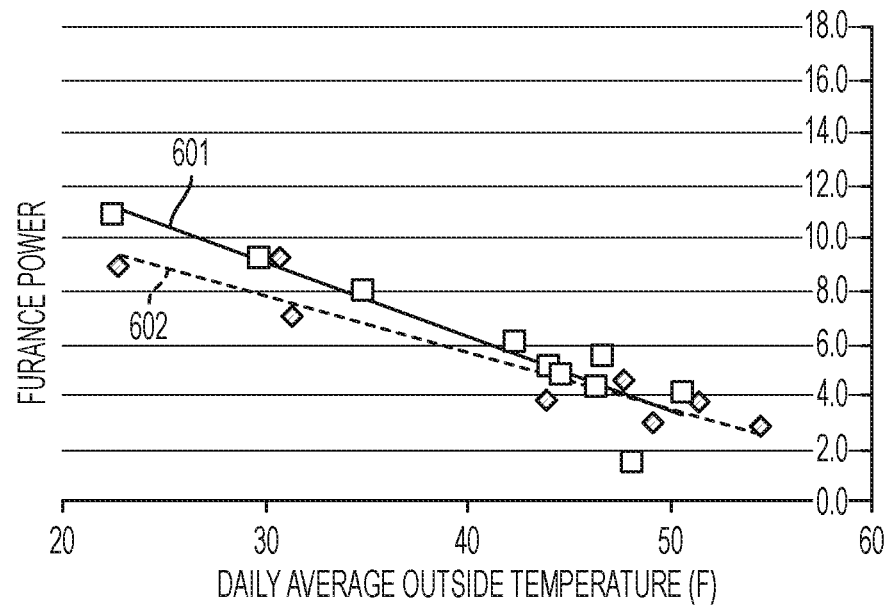

The various embodiments of the HVAC system 100 discussed above are capable of controlling the temperature within the enclosed space 101 while at the same time reducing an amount of energy used by the HVAC system 100 as compared to an HVAC system that does not utilize an embodiment of the process 400. FIGS. 5 and 6 are charts illustrating energy savings of HVAC systems utilizing the disclosed methods. FIG. 5 illustrates daily heating consumption for a first house and FIG. 6 illustrates daily heating consumption for a second house. FIGS. 5 and 6 show furnace power versus daily average outside temperature for real-world tests. In FIGS. 5 and 6, the square data points represent furnace power at a particular average outside temperature for a user-controlled HVAC system and the diamond data points represent furnace power at a particular average outside temperature for an HVAC system employing an embodiment of the process 400. In FIG. 5, a trend line 501 identifies a trend of furnace power for the user-controlled HVAC system and a trend line 502 illustrates a trend of furnace power for the HVAC system employing an embodiment of the process 400. In FIG. 6, a trend line 601 identifies a trend of furnace power for the user-controlled HVAC system and a trend line 602 illustrates a trend of furnace power for the HVAC system employing an embodiment of the process 400. As evidenced in FIGS. 5 and 6, furnace power was reduced when using the HVAC system that employed the process 400 compared to a user-controlled system that did not employ the process 400.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the CPU 240, one or more portions of the memory 250, one or more portions of the mass storage device 246, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of operating a heating, ventilation, and air conditioning (HVAC) system, the method comprising, by a controller comprising a central processing unit and memory:
predicting, during an unoccupied time, a first predicted temperature of an enclosed space, wherein the first predicted temperature of the enclosed space corresponds to an estimated temperature of the enclosed space using historical temperature data at a return time of a user with the HVAC system off, wherein the step of predicting the first predicted temperature is repeated to update the first predicted temperature;
determining if the first predicted temperature is less than a set-point temperature based, at least in part, on the return time of the user;
responsive to a determination that the first predicted temperature is less than the set-point temperature, predicting a second predicted temperature of the enclosed space if the HVAC system is operated for a first runtime;
determining if the second predicted temperature is less than the set-point temperature based, at least in part, on the return time of the user; and
responsive to a determination that the second predicted temperature is not less than the set-point temperature, operating the HVAC system for the first runtime prior to the return time of the user, wherein an end of the first runtime coincides with the return time of the user to maintain an actual temperature of the enclosed space at or above a minimum temperature during the unoccupied time.

2. The method of claim 1, further comprising responsive to a determination that the second predicted temperature is less than the set-point temperature, repeating, for an increased runtime, the step of predicting a second predicted temperature and the step of determining if the second predicted temperature is less than the set-point temperature based, at least in part, on the return time of the user.

3. The method of claim 1, further comprising, prior to the step of predicting the first predicted temperature, determining if the enclosed space is unoccupied.

4. The method of claim 3, further comprising:
responsive to a determination that the enclosed space is unoccupied, setting a heating demand to the minimum temperature for the unoccupied time; and
proceeding to the step of predicting the first predicted temperature.

5. The method of claim 3, further comprising, responsive to a determination that the enclosed space is occupied, repeating the step of determining if the enclosed space is unoccupied until the determination is made that the enclosed space is unoccupied.

6. The method of claim 3, wherein the unoccupied time is a parameter set by the user that indicates a period of time the enclosed space is unoccupied, the period of time comprising the return time.

7. The method of claim 3, wherein the step of determining if the enclosed space is unoccupied comprises determining if a motion sensor has detected motion within the enclosed space.

8. The method of claim 3, wherein:
the HVAC system includes a heating element; and
when the HVAC system operates in a defrost mode, the heating element is not operated to warm air circulated through the enclosed space when the space is unoccupied.

9. The method of claim 1, further comprising, responsive to a determination that the first predicted temperature is greater than the set-point temperature, instructing the HVAC system to not operate during the unoccupied time.

10. The method of claim 1, wherein, when performing the step of predicting the first predicted temperature, the controller uses data from an external data source.

11. The method of claim 1, wherein the step of repeating is done in response to updated weather data from an external data source.

12. The method of claim 1, wherein:
the HVAC system is capable of providing heat to the enclosed space by at least two of heat pump operation, electric heating element operation, and furnace operation; and
the predicting the second predicted temperature of the enclosed space further comprises selecting, based on cost to operate, one or more of heat pump operation, electric heating element operation, and furnace operation to provide heat to the enclosed space.

13. An A heating, ventilation, and air conditioning (HVAC) system comprising:
a compressor configured to compress a refrigerant;
an evaporator coil coupled to the compressor and configured to receive the refrigerant;
a condenser coil coupled between the evaporator coil and the compressor;
a controller comprising a central processing unit and memory, the controller configured to perform the following steps:
predict, during an unoccupied time, a first predicted temperature of an enclosed space, wherein the first predicted temperature of the enclosed space corresponds to an estimated temperature of the enclosed space using historical temperature data at a return time of a user with the HVAC system off, wherein the step of predicting the first predicted temperature is repeated to update the first predicted temperature;
determine if the first predicted temperature is less than a set-point temperature based, at least in part, on the return time of the user;
responsive to a determination that the first predicted temperature is less than the set-point temperature, predict a second predicted temperature of the enclosed space if the HVAC system is operated for a first runtime;
determine if the second predicted temperature is less than the set-point temperature based, at least in part, on the return time of the user; and
responsive to a determination that the second predicted temperature is less than the set-point temperature, operate the HVAC system for the first runtime prior to the return time of the user, wherein an end of the first runtime coincides with the return time of the user to maintain an actual temperature of the enclosed space at or above a minimum temperature during the unoccupied time.

14. The HVAC system of claim 13, wherein the controller is further configured to perform the following step:
responsive to a determination that the second predicted temperature is less than the set-point temperature, repeat, for an increased runtime, the step of predicting a second predicted temperature and the step of determining if the second predicted temperature is less than the set-point temperature based, at least in part, on the return time of the user.

15. The HVAC system of claim 13, wherein the controller is further configured to perform the following step:
wherein, when performing the step of predicting the first predicted temperature, the controller uses data from an external data source.

16. The HVAC system of claim 13, wherein:
the HVAC system is capable of providing heat to the enclosed space by at least two of heat pump operation, electric heating element operation, and furnace operation; and
the controller is further configured to predict the second predicted temperature of the enclosed space by selecting, based on cost to operate, one or more of heat pump operation, electric heating element operation, and furnace operation to provide heat to the enclosed space.

17. A method of operating a heating, ventilation, and air conditioning (HVAC) system using a controller, the method comprising:
determining if an enclosed space of the HVAC system is unoccupied;
responsive to a determination that the enclosed space is unoccupied, setting a heating demand to a minimum temperature for an unoccupied time;
predicting, during the unoccupied time, a first predicted temperature of the enclosed space, wherein the first predicted temperature of the enclosed space corresponds to an estimated temperature of the enclosed space using historical temperature data at a return time of a user, wherein the step of predicting the first predicted temperature is repeated to update the first predicted temperature;

determining if the first predicted temperature is less than a set-point temperature based, at least in part, on the return time of the user;

responsive to a determination that the first predicted temperature is less than the set-point temperature, predicting a second predicted temperature of the enclosed space if the HVAC system is operated for a first runtime;

determining if the second predicted temperature is less than the set-point temperature based, at least in part, on the return time of the user;

responsive to a determination that the second predicted temperature is less than the set-point temperature, operating the HVAC system for the first runtime prior to the return time of the user, wherein an end of the first runtime coincides with the return time of the user; and responsive to a determination that the second predicted temperature is less than the set-point temperature, repeating, for an increased runtime, the step of predicting the second predicted temperature and the step of determining if the second predicted temperature is less than the set-point temperature based, at least in part, on the return time of the user to maintain an actual temperature of the enclosed space at or above the minimum temperature during the unoccupied time.

* * * * *